(12) United States Patent
Racho et al.

(10) Patent No.: US 12,249,818 B2
(45) Date of Patent: Mar. 11, 2025

(54) ELECTRICAL ASSEMBLY

(71) Applicant: Lear Corporation, Southfield, MI (US)

(72) Inventors: Edgar Michael T. Racho, Lapu-Lapu (PH); Lewis Galligan, Novi, MI (US); Albert M. Cabañero, Cebu (PH)

(73) Assignee: Lear Corporation, Southfield, MI (US)

( * ) Notice: Subject to any disclaimer, the term of this patent is extended or adjusted under 35 U.S.C. 154(b) by 192 days.

(21) Appl. No.: 18/115,292

(22) Filed: Feb. 28, 2023

(65) Prior Publication Data
US 2024/0291260 A1 Aug. 29, 2024

(51) Int. Cl.
| | |
|---|---|
| *H02G 15/00* | (2006.01) |
| *H01R 12/65* | (2011.01) |
| *H02G 1/00* | (2006.01) |
| *H02G 15/117* | (2006.01) |
| *H01R 43/02* | (2006.01) |
| *H02G 15/113* | (2006.01) |
| *H02G 15/115* | (2006.01) |

(52) U.S. Cl.
CPC ........... *H02G 15/117* (2013.01); *H01R 12/65* (2013.01); *H02G 1/00* (2013.01); *H01R 43/0207* (2013.01); *H01R 43/0221* (2013.01); *H02G 15/113* (2013.01); *H02G 15/115* (2013.01)

(58) Field of Classification Search
CPC ...... H02G 15/117; H02G 1/00; H02G 15/113; H02G 15/115; H01R 12/65; H01R 43/0207; H01R 43/0221
See application file for complete search history.

(56) References Cited

U.S. PATENT DOCUMENTS

| | | | |
|---|---|---|---|
| 4,737,118 A | 4/1988 | Lockard | |
| 7,040,917 B2 | 5/2006 | Yagi | |
| 7,581,979 B2 | 9/2009 | Kumakura | |
| 10,431,906 B1 | 10/2019 | Reed | |
| 2014/0262431 A1* | 9/2014 | Crain, Jr. ............. | G02B 6/4471 174/117 R |
| 2015/0293314 A1* | 10/2015 | Byczkiewicz ......... | H01B 11/20 385/100 |
| 2017/0125958 A1* | 5/2017 | Kim ..................... | H01B 7/0009 |
| 2019/0173219 A1 | 6/2019 | Sakai | |

\* cited by examiner

*Primary Examiner* — Pete T Lee
(74) *Attorney, Agent, or Firm* — Fishman Stewart PLLC

(57) ABSTRACT

An assembly includes a housing, a flat cable, a first wire, a second wire, a first terminal, a second terminal, and a divider. The flat cable may be disposed at least partially in the housing and may include a first exposed conductor portion and a second exposed conductor portion. The first wire and the second wire may be disposed partially in the housing. The first terminal and the second terminal may be disposed in the housing. The first terminal may be connected to the first exposed conductor portion and the first wire such that the first exposed conductor portion is electrically connected to the first wire. The second terminal may be connected to the second exposed conductor portion and the second wire such that the second exposed conductor portion is electrically connected to the second wire. The divider may be disposed between the first terminal and the second terminal.

20 Claims, 12 Drawing Sheets

ELECTRICAL ASSEMBLY

TECHNICAL FIELD

The present disclosure generally relates to electrical assemblies, including electrical connectors, electrical wires, and/or flat cables that may, for example, be utilized in connection with and/or incorporated into vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
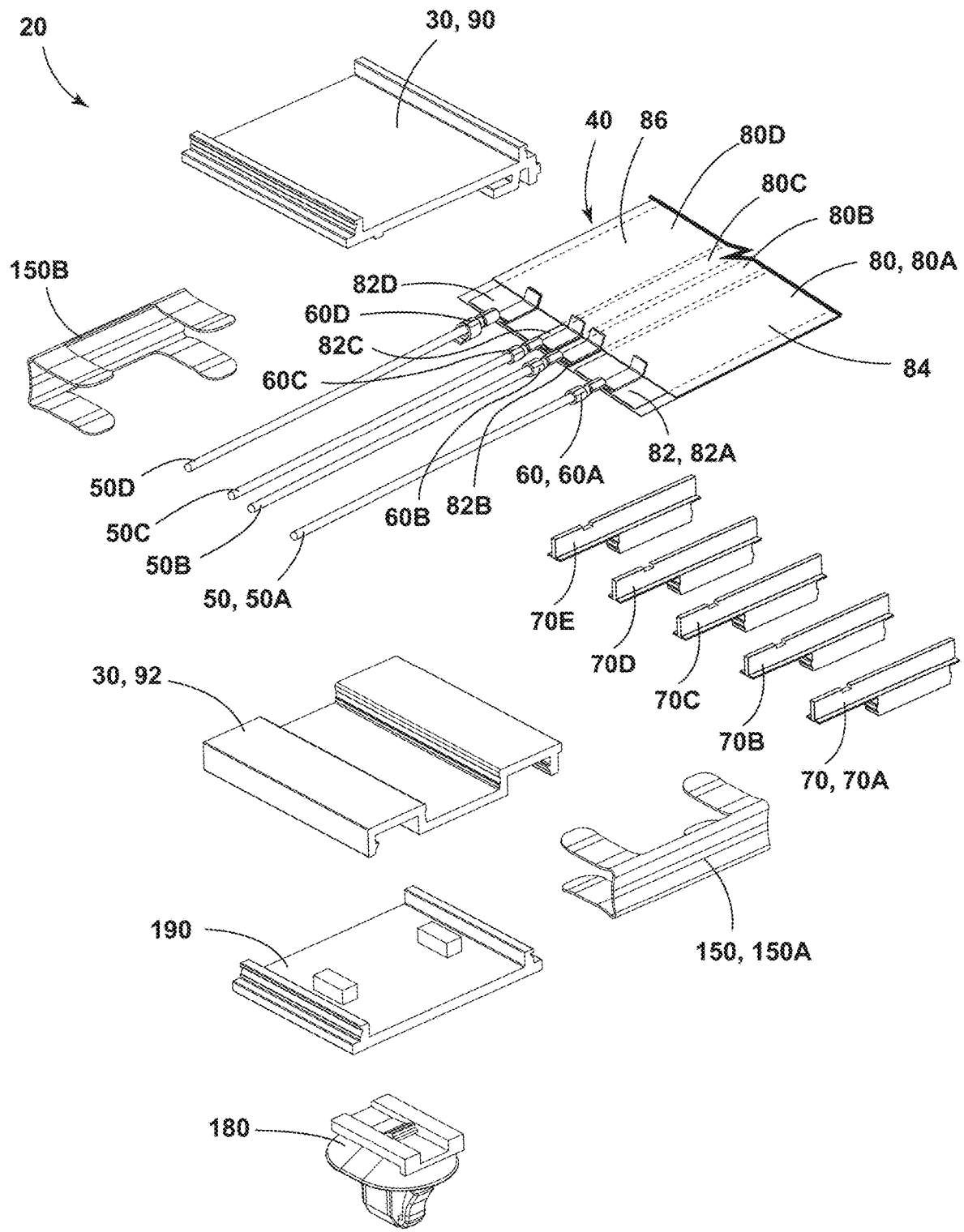
FIG. 1 is an exploded perspective view generally illustrating an embodiment of an electrical assembly according to teachings of the present disclosure.
Figure 2:
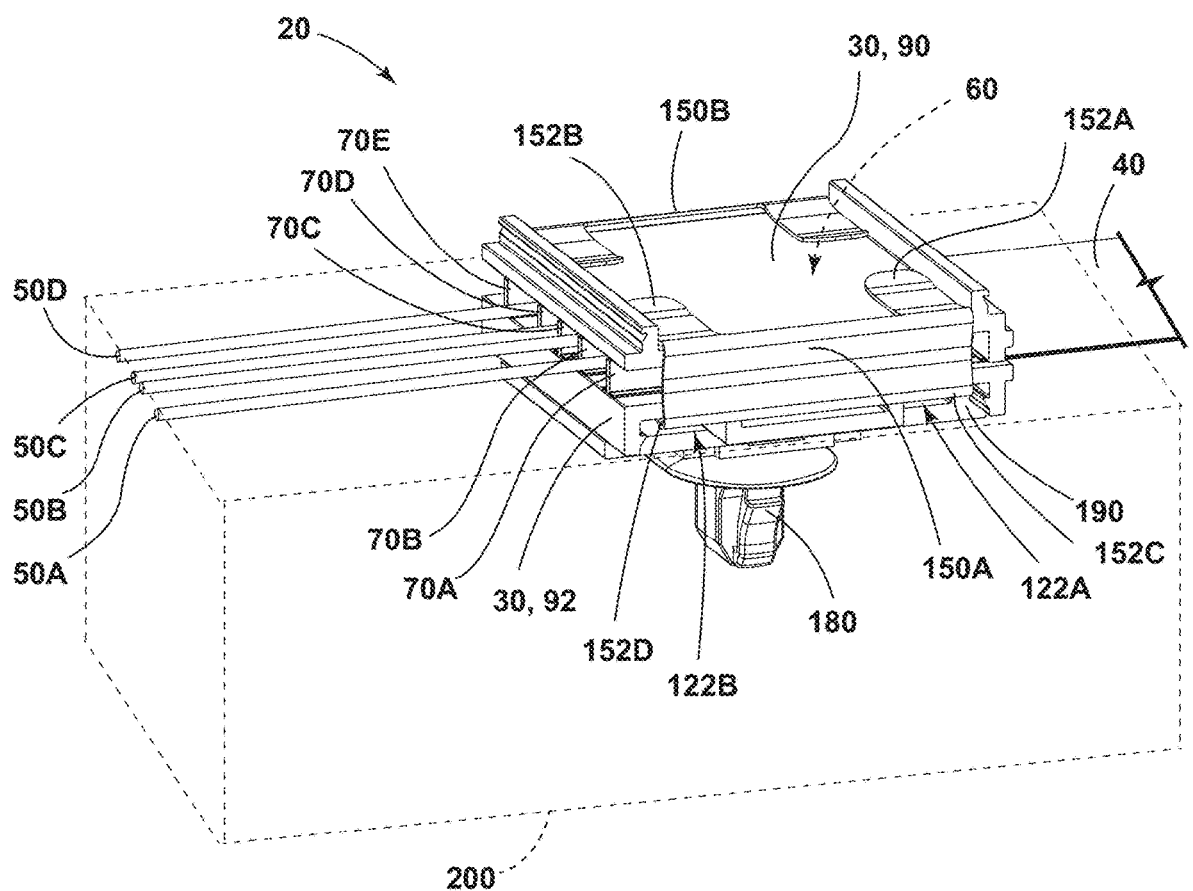
FIG. 2 is a perspective view generally illustrating an embodiment of an electrical assembly according to teachings of the present disclosure.

FIGS. 1 and 2 present an electrical assembly 20 including a housing 30, a flat cable 40, one or more electrical wires 50 (e.g., electrical wires 50A-50D), one or more terminals 60 (e.g., terminals 60A-60D), and one or more dividers 70 (e.g., dividers 70A-70E). The housing 30 is configured for connection with the flat cable 40, the electrical wires 50, the terminals 60, and/or the dividers 70. A terminal 60 is configured for connection with the flat cable 40 and an electrical wire 50. The dividers 70 are configured for connection with the housing 30. The cable 40 includes one or more electrical conductors 80 (e.g., conductors 80A-80D) that have exposed portions 82 (e.g., exposed portions 82A-82D). In an assembled configuration, the cable 40 is disposed at least partially in the housing 30, the wires 50 (e.g., conventional round wires) are disposed partially in the housing 30, and the terminals 60 and the dividers 70 are disposed in the housing 30.

FIG. 1 shows a first terminal 60A connected to a first exposed conductor portion 82A and a first wire 50A such that the first exposed conductor portion 82A is electrically connected to the first wire 50A, a second terminal 60B connected to a second exposed conductor portion 82B and a second wire 50B such that the second exposed conductor portion 82B is electrically connected to the second wire 50B, a third terminal 60C connected to a third exposed conductor portion 82C and a third wire 50C such that the third exposed conductor portion 82C is electrically connected to the third wire 50C, and a fourth terminal 60D connected to a fourth exposed conductor portion 82D and a fourth wire 50D such that the fourth exposed conductor portion 82D is electrically connected to the fourth wire 50D. In some example configurations, a first distance D1 between the first terminal 60A and the second terminal 60B is different than a second distance D2 between the second terminal 60B and the third terminal 60C (see, e.g., FIG. 3). The assembly 20 is shown including four wires 50, terminals 60, and exposed conductor portions 82, however the assembly 20 may include more or less than four wires 50, terminals 60, and exposed conductor portions 82.

Figure 3:
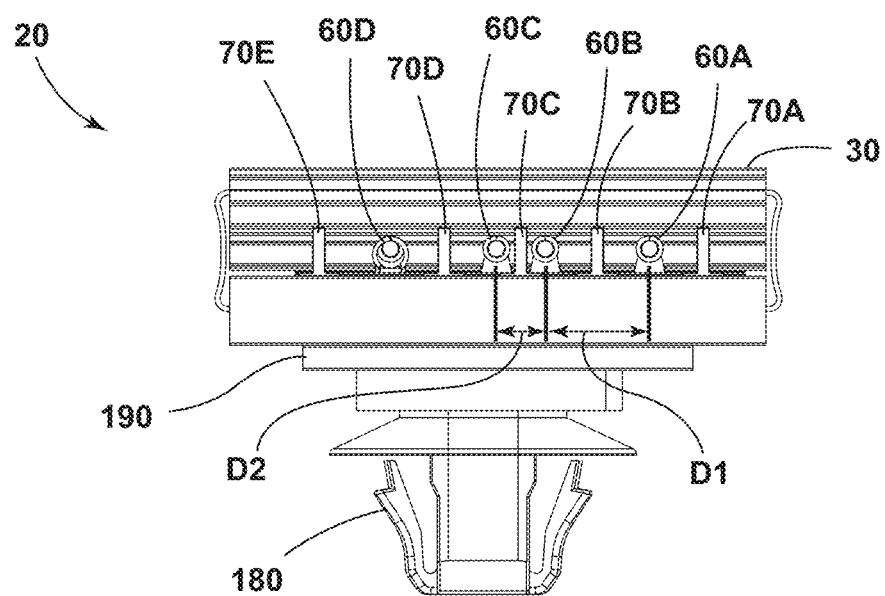
FIG. 3 is a cross-sectional view generally illustrating embodiments of an electrical assembly according to teachings of the present disclosure.

FIG. 3 shows a first divider 70A disposed adjacent the first terminal 60A, a second divider 70B disposed between the first terminal 60A and the second terminal 60B, a third divider 70C disposed between the second terminal 60B and the third terminal 60C, a fourth divider 70D disposed between the third terminal 60C and a fourth terminal 60D, and a fifth divider 70E disposed adjacent the fourth terminal 60D. In some instances, a divider 70 is configured to electrically isolate adjacent terminals 60. The assembly 20 is shown including five dividers 70, however the assembly 20 may include more or less than five dividers 70.

FIGS. 1 and 2 illustrate a housing 30 including a first cover 90 (e.g., an upper housing cover) and a second cover 92 (e.g., a lower housing cover). The first cover 90 is configured for connection with the second cover 92, the flat cable 40, the electrical wires 50, the terminals 60, and/or the dividers 70. The second cover 92 is configured for connection with the first cover 90, the flat cable 40, the electrical wires 50, the terminals 60, and/or the dividers 70.

Figure 4:
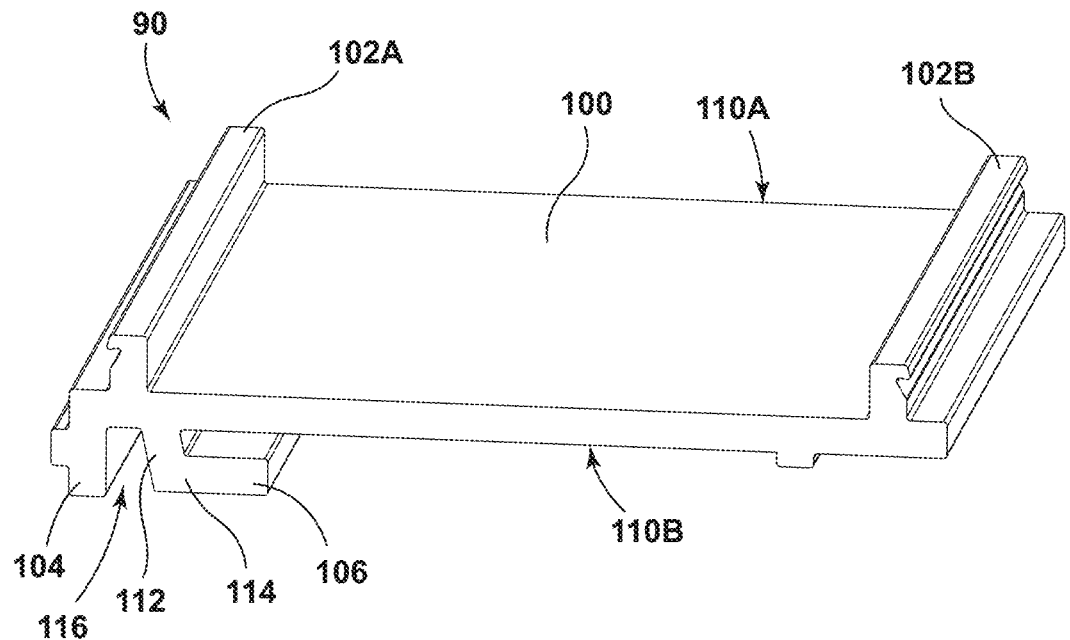
FIG. 4 is a perspective view generally illustrating an embodiment of a first cover of a housing according to teachings of the present disclosure.
Figure 6:
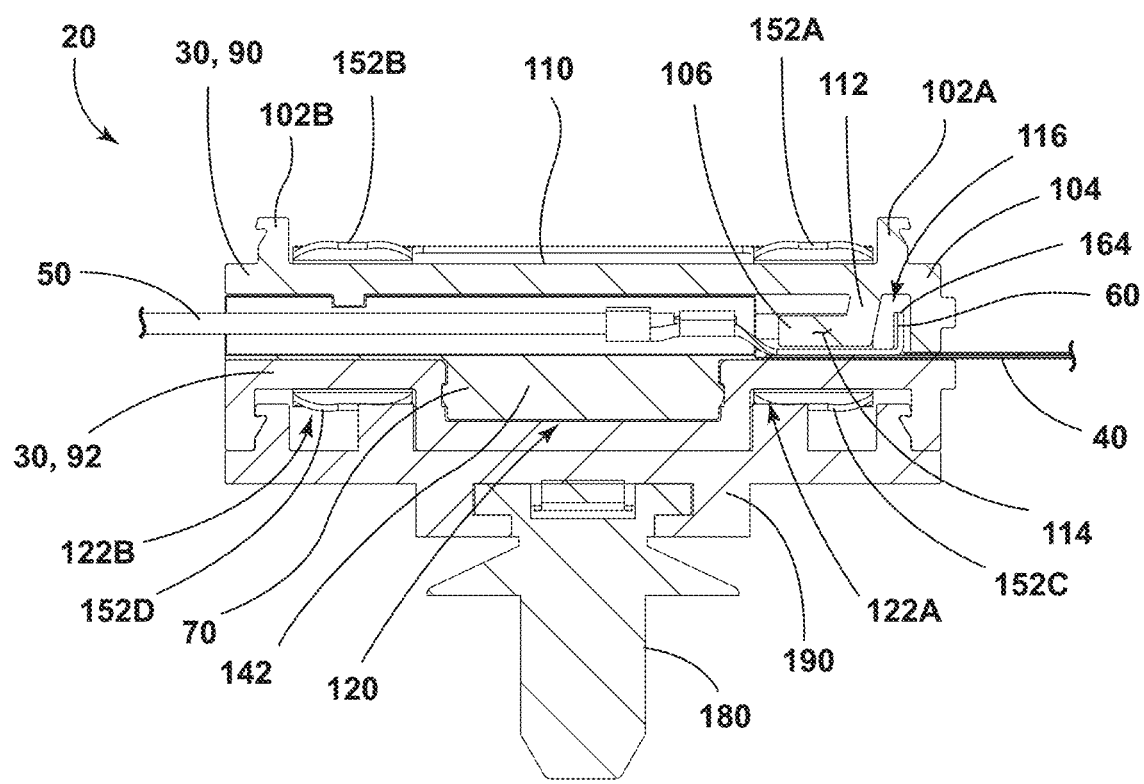
FIG. 6 is a cross-sectional view generally illustrating embodiments of an electrical assembly according to teachings of the present disclosure.

FIG. 4 illustrates a first cover 90 including a planar base 100, a first attachment feature 102A, a second attachment feature 102B, a wall 104, and/or a projection 106. Without limitation, in some configurations, the first attachment feature 102A and/or the second attachment feature 102B may comprise a wall-like portion (e.g., a beam) that includes a portion (e.g., upper portion) configured to connect to a separate component. In some example configurations, the first attachment feature 102A and the second attachment feature 102B extend from a first side 110A of the base 100 and/or are configured to connected with a second cover 92' of a second housing 30' (see, e.g., FIG. 12). The wall 104 and the projection 106 extend from a second side 110B of the base 100 and/or the projection 106 is spaced apart from the wall 104. In some implementations, the projection 106 includes a first part 112 that extends from the base 110 and a second part 114 that extends parallel to and spaced part from the base 110. Referring now to FIG. 6, in an assembled configuration, portions of the terminals 60 are disposed in a recess 116 disposed between the wall 104 and the first part 112 of the projection 106.

Figure 5:
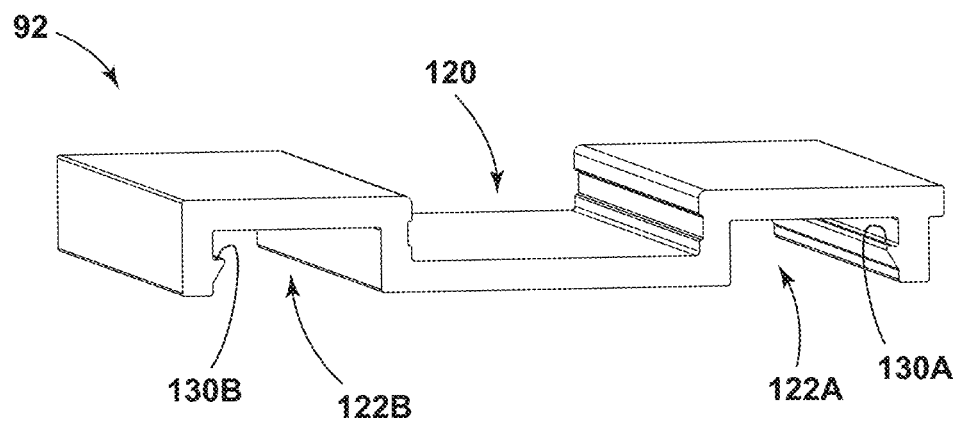
FIG. 5 is a perspective view generally illustrating an embodiment of a second cover of a housing according to teachings of the present disclosure.
Figure 14:
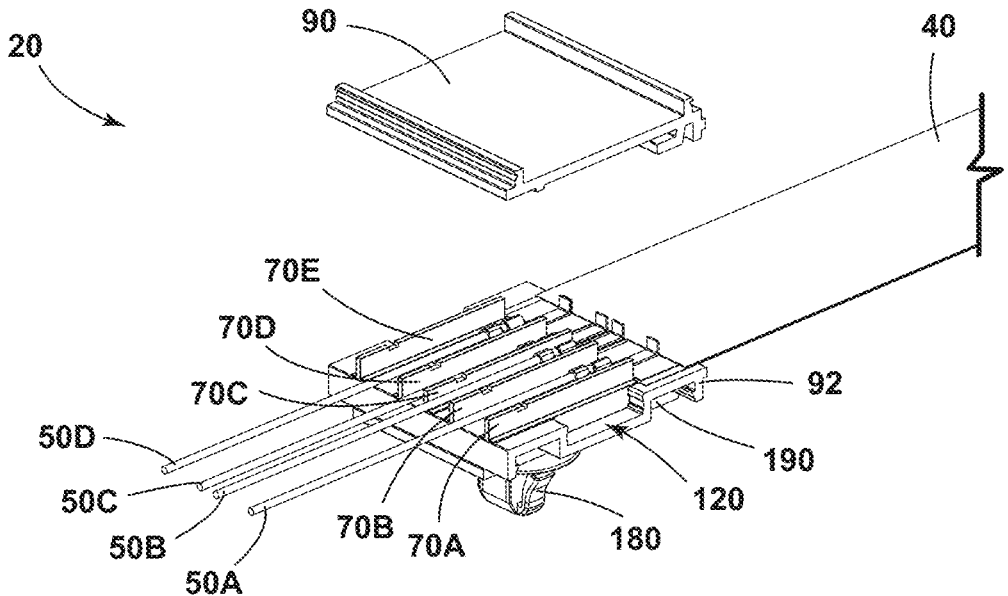

FIG. 5 illustrates a second cover 92 including an inner channel 120, a first outer channel 122A, and a second outer channel 122B. In some example configurations, the inner channel 120 is disposed between the first outer channel 122A and the second outer channel 122B. In an assembled configuration, the dividers 70 are partially disposed in the inner channel 120 (see, e.g., FIG. 14).

With continued reference to FIG. 5, in some instances, the second cover 92 includes a first attachment structure 130A disposed in the first outer channel 122A and a second attachment structure 130B disposed in the second outer channel 122B. In some examples, the first attachment structure 130A is configured to connect with a first attachment feature 102A of a first cover 90 and the second attachment structure 130B is configured to connection with a second attachment feature 102B of the first cover 90 (see, e.g., FIG. 12).

With reference to FIG. 1, a flat cable 40 includes an elongated body 84 having one or more electrical conductors 80 and/or an insulating material 86 that electrically insulates the conductors and/or the conductors 80 from each other and/or other components. The electrical conductors 80 include exposed portions 82 that are not completely covered by insulating material 86 and/or from which insulating material 86 has been removed. The one or more conductors 80 and exposed portions 82 may be disposed in parallel with each other and/or may be substantially aligned with a common plane. The one or more conductors 80 may, in some configurations, be integrally formed with the insulating material 86. The conductor portions 80 may have varying sized widths.

Figure 7:
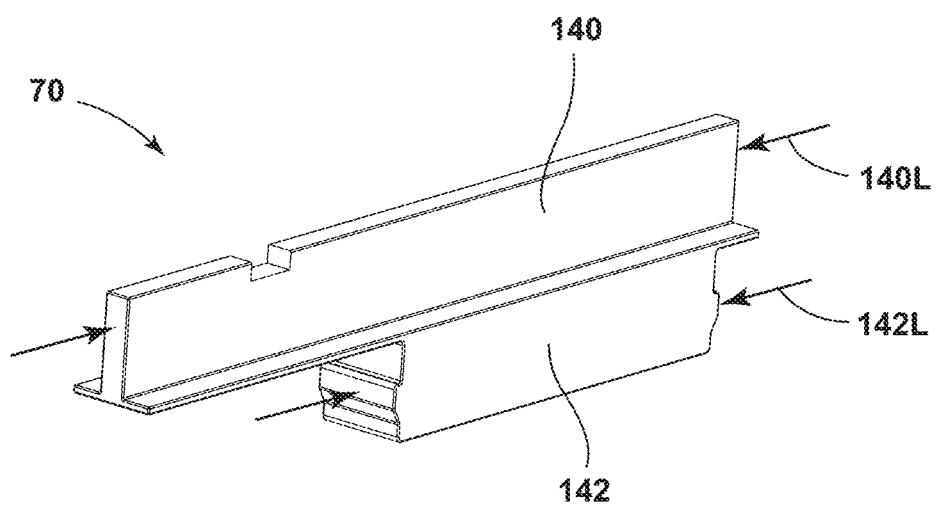
FIG. 7 is a perspective view generally illustrating an embodiment of a divider according to teachings of the present disclosure.

FIG. 7 illustrates a divider 70 including an elongated first portion 140 and a second portion 142 extending from the first portion 140. In some example configurations, the first portion 140 includes a length 140L that is greater than a length 142L of the second portion 142. Referring now to FIG. 6, in an assembled configuration, the second portion 142 is disposed in the inner channel 120 of the second cover 90. For instance, a divider 70 is positively engaged with the inner channel 120 such that removal of the divider 70 from the second cover is restricted.

Figure 9:
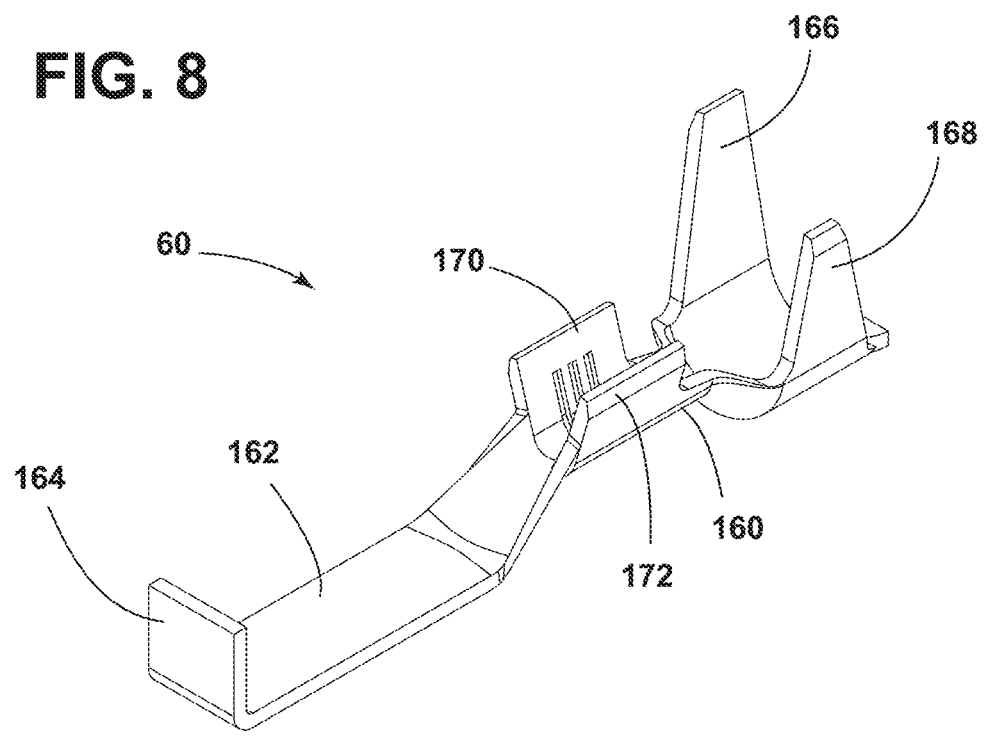
FIG. 9 is a perspective view generally illustrating an embodiment of a terminal according to teachings of the present disclosure.

FIG. 9 illustrates a terminal 60 including a base 160, a planar portion 162 connected to the base 160, a tab 164 extending perpendicularly from an end of the planar portion 162, a first wing 166, a second wing 168, a third wing 170, and a fourth wing 172. The first wing 166, the second wing 168, the third wing 170, and the fourth wing 172 extend from the base 160. The second wing 168 is spaced apart from the first wing 166, the third wing 170 is disposed adjacent the first wing 166, and the fourth wing 172 is spaced apart from the third wing 170. In some instances, the planar portion 162 is welded (e.g., laser welded, ultrasonic welded) to an exposed conductor portion 82 of the flat cable 40. The first wing 166, the second wing 168, the third wing 170, and the fourth wing 172 are crimped to connect a wire 50 (e.g., a conventional round wire) with the terminal 60. In some example configurations, the tab 164 is disposed in a recess 116 of the first cover 90.

Referring again to FIGS. 1 and 2, the electrical assembly 20 includes one or more clips 150 (e.g., clips 150A, 150B). The clips 150 secure the first cover 90 with the second cover 92. In some example configurations, a second clip 150B is arranged opposite a first clip 150A.

Figure 8:
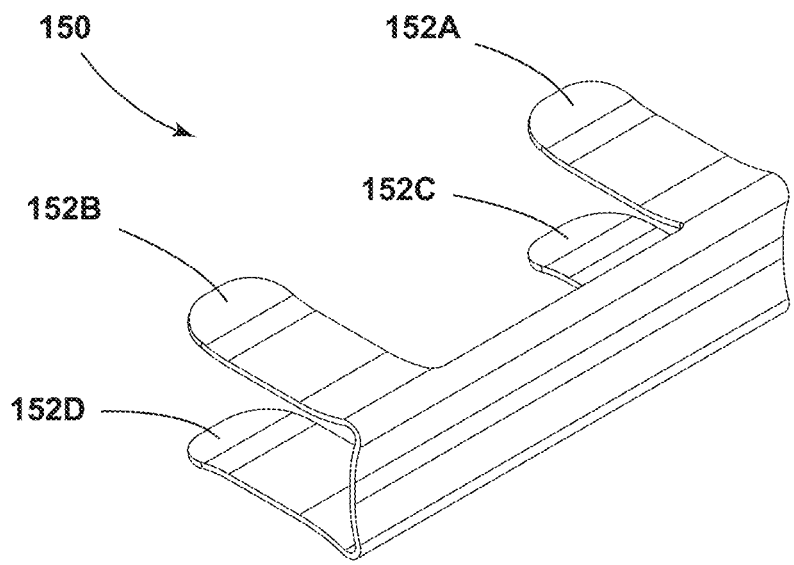
FIG. 8 is a perspective view generally illustrating an embodiment of a clip according to teachings of the present disclosure.

FIG. 8 illustrates a clip 150 including a first leg 152A, a second leg 152B, a third leg 152C, and a fourth leg 152D. Referring now to FIG. 2, in an assembled configuration, the first leg 152A and the second leg 152B are in contact with an outer side of the first cover 90. The third leg 152C is disposed in the first outer channel 122A of the second cover 92 and the fourth leg 152D is disposed in the second outer channel 122B of the second cover 92.

Figure 10:
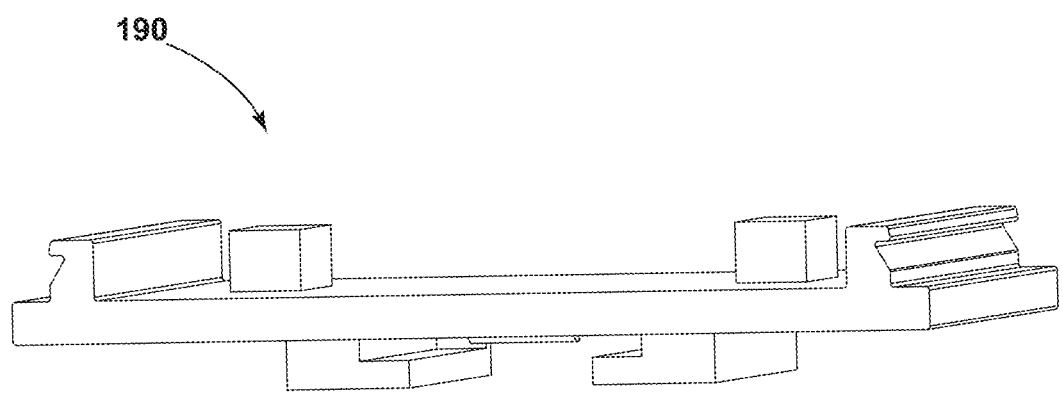
FIG. 10 is a perspective view generally illustrating an embodiment of a fastener bracket according to teachings of the present disclosure.

With reference to FIGS. 1, 2, and 10, in some example configurations, the electrical assembly 20 includes a fastener 180 and a fastener bracket 190. The fastener bracket 190 is configured for detachable connection with the housing 30 (e.g., the second cover 92). The fastener 180 is configured for detachable connection with the fastener bracket 190. Referring now to FIG. 2, the fastener 180 is configured for connection with an external object 200 (e.g., a portion, a surface, and/or a component of a vehicle).

Figure 11:
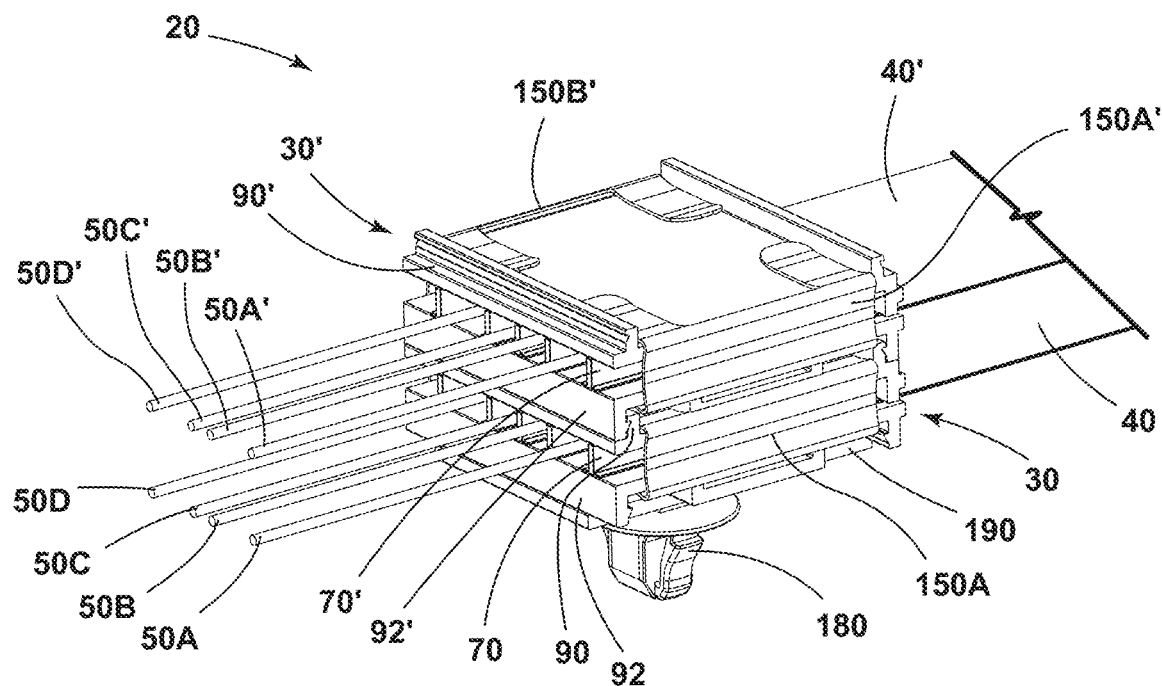
FIG. 11 is a perspective view generally illustrating an embodiment of an electrical assembly according to teachings of the present disclosure.
Figure 12:
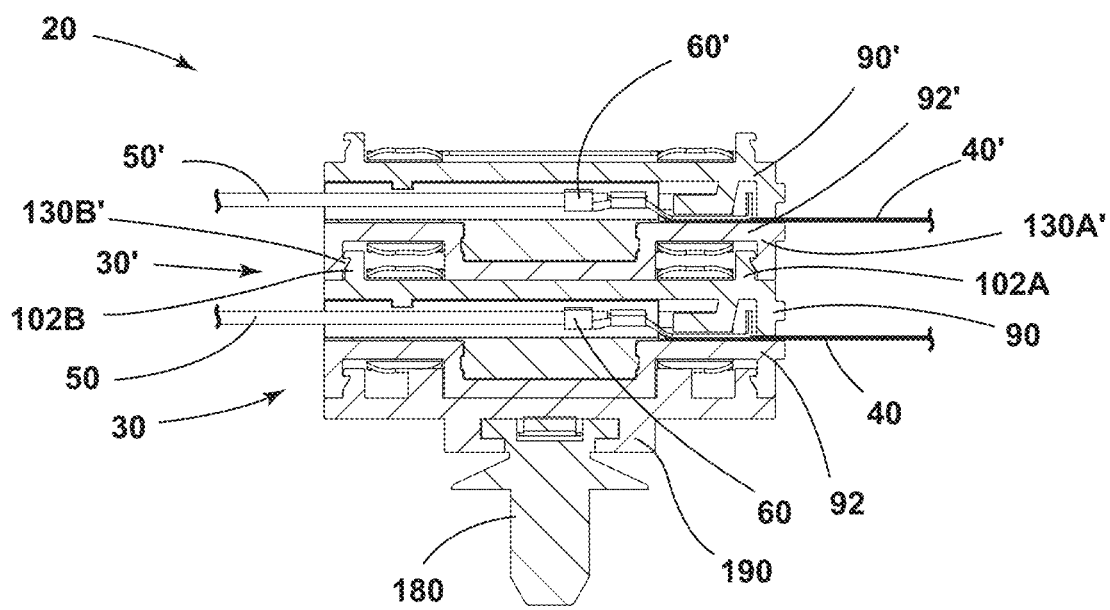
FIG. 12 is a cross-sectional view generally illustrating embodiments of an electrical assembly according to teachings of the present disclosure.
Figure 13:
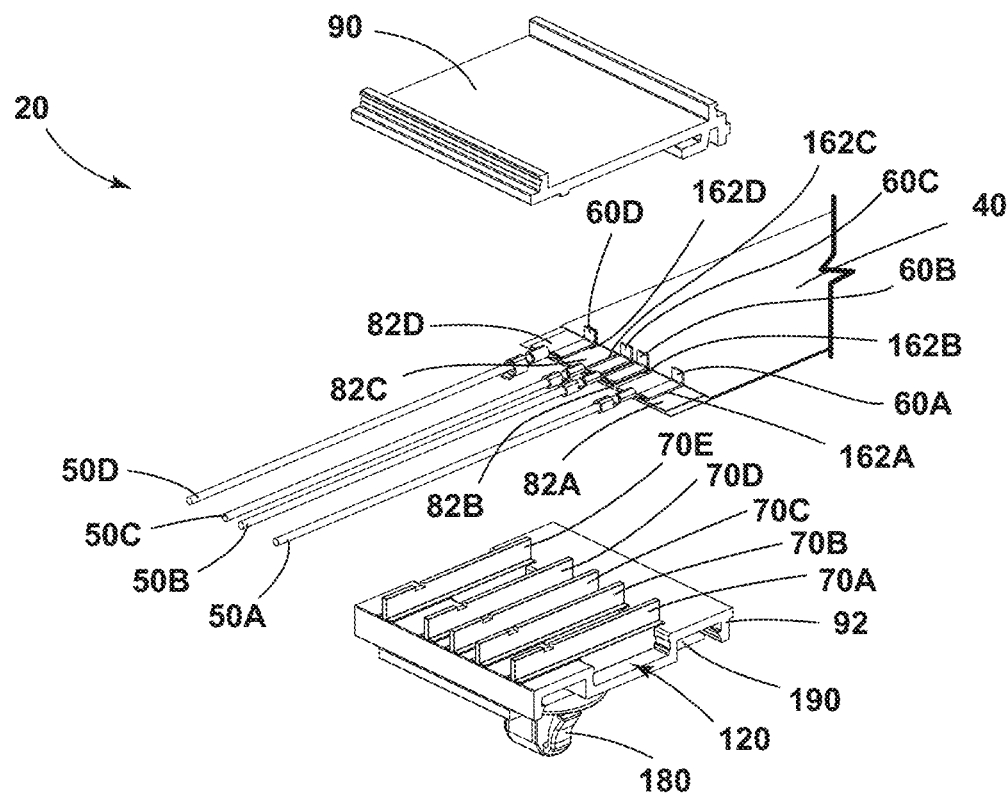
FIGS. 13-17 are perspective views generally illustrating portions of an embodiment of a method of assembling an electrical assembly according to teachings of the present disclosure.

FIGS. 11 and 12 illustrate an electrical assembly 20 including a second housing 30' and a second flat cable 40'. The second housing 30' is configured for connection with the housing 30. The second housing 30' includes an identical configuration as the housing 30. The second cable 40' is disposed at least partially in the second housing 30'. The second housing 30' includes a second housing first cover 90' and a second housing second cover 92'. In an assembled configuration, the second housing second cover 92' is stacked on and engaged with the first cover 90 of the housing 30. In some instances, the second housing 30' is connected with the housing 30 such that a first attachment feature 102A and a second attachment feature 102B of the first cover 90 of the housing 30 are in contact with a first attachment structure 130A' and a second attachment structure 130B' of the second housing second cover 92'.

FIGS. 13-17 present a method of assembling an electrical assembly 20. The method includes disposing the dividers 70 (e.g., dividers 70A-70E) in the inner channel 122 of the second cover 92. The method includes crimping the wings (e.g., 166, 168, 170, 172) of the terminals 60 (e.g., terminals 60A-60D) to connect the wires 50 (e.g., wires 50A-50D) with the terminals 60. The method includes fixing (e.g., laser welding, ultrasonic welding) the planar portions 162 (e.g., planar portion 162A-162D) of the terminals 60 to exposed conductor portions 82 (e.g., exposed conductor portions 82A-82D) of the flat cable 40 (see, e.g., FIG. 13). The method includes disposing the flat cable 40 in contact with the second cover 92 such that the dividers 70 are disposed between adjacent terminals 60 (see, e.g., FIG. 14).

Figure 15:
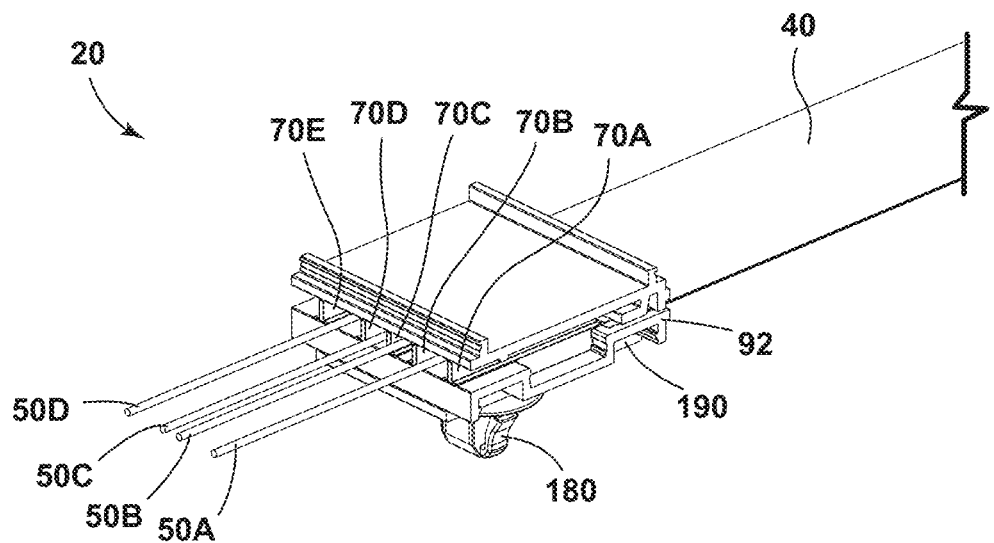
Figure 16:
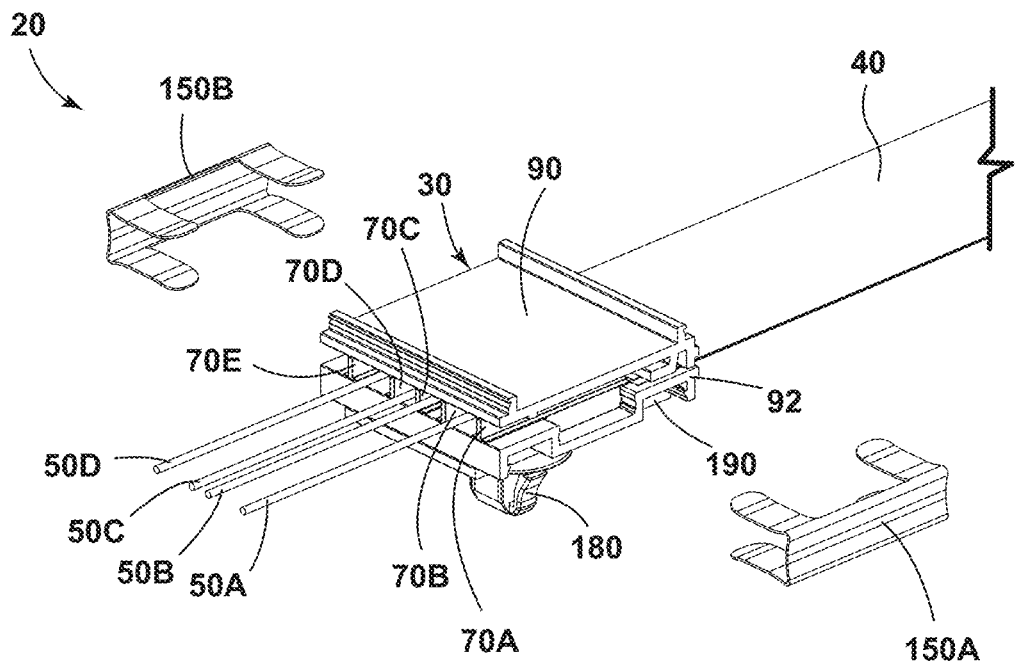
Figure 17:
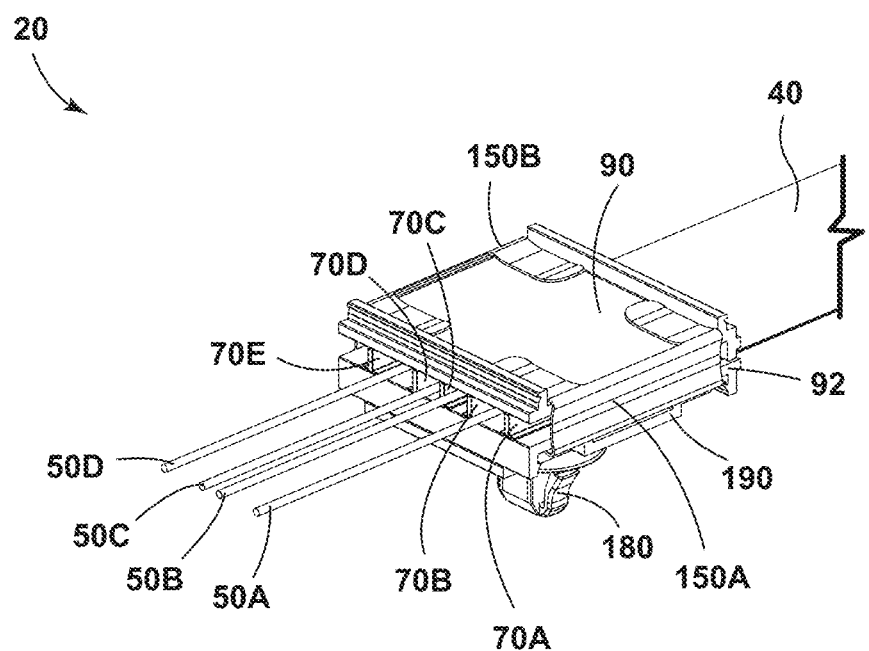

Referring now to FIG. 15, the method includes connecting the first cover 90 with the second cover 92. Referring now to FIG. 16, the method includes connecting a first clip 150A and a second clip 150B to the housing 30.

In some example configurations, the method includes disposing at least a portion of a second flat cable 40' in a second housing 30'. The method includes stacking the second housing 30' on the housing 30 such that the second housing 30' is engaged with the housing 30 (see, e.g., FIG. 11).

With reference to FIGS. 13-17, the method includes connecting a fastener bracket 190 to the housing 30. The method includes connecting a fastener 180 to the fastener bracket 190. The method includes connecting the assembly 20 with an external object 200 (see, e.g., FIG. 2).

This disclosure includes, without limitation, the following embodiments:

1. An assembly, comprising: a housing; a flat cable disposed at least partially in the housing and including a first exposed conductor portion and a second exposed conductor portion; a first wire disposed partially in the housing; a second wire disposed partially in the housing; a first terminal disposed in the housing, the first terminal connected to the first exposed conductor portion and the first wire such that the first exposed conductor portion is electrically connected to the first wire; a second terminal disposed in the housing, the second terminal connected to the second exposed conductor portion and the second wire such that the second exposed conductor portion is electrically connected to the second wire; and a divider disposed between the first terminal and the second terminal, the divider formed separately from the housing.
2. The assembly according to embodiment 1, wherein the housing includes a first cover and a second cover.
3. The assembly according to any preceding embodiment, wherein the first cover includes: a planar base; a first attachment feature extending from a first side of the base; a second attachment feature extending from the first side of the base; a wall extending from a second side of the base; and a projection extending from the second side of the base and spaced apart from the wall.
4. The assembly according to any preceding embodiment, wherein the projection includes a first part extending from the base and a second part extending parallel to and spaced apart from the base; and in an assembled configuration, portions of the first terminal and the second terminal are disposed in a recess disposed between the wall and the first part of the projection.
5. The assembly according to any preceding embodiment, wherein: the second cover includes an inner channel; and the divider is partially disposed in the inner channel.
6. The assembly according to any preceding embodiment, wherein: the second cover includes a first outer channel and a second outer channel; the inner channel is disposed between the first outer channel and the second outer channel; and the second cover includes a first attachment structure disposed in the first outer channel and a second attachment structure disposed in the second outer channel.
7. The assembly according to any preceding embodiment, wherein the divider includes an elongated first portion and a second portion extending from the first portion; the first portion includes a length greater than a length of the second portion; and in an assembled configuration, the second portion is disposed in the inner channel of the second cover.
8. The assembly according to any preceding embodiment, wherein in the assembled configuration, the divider is positively engaged with the inner channel of the second cover such that removal of the divider from the second cover is restricted.
9. The assembly according to any preceding embodiment, including a clip; wherein the housing includes a first cover and a second cover; and the clip secures the first cover with the second cover.
10. The assembly according to any preceding embodiment, wherein: the clip includes a first leg, a second leg, a third leg, and a fourth leg; in an assembled configuration, the first leg and the second leg are in contact with an outer side of the first cover; the third leg is disposed in a first outer channel of the second cover; and the fourth leg is disposed in a second outer channel of the second cover.
11. The assembly according to any preceding embodiment, including a second clip arranged opposite the clip.
12. The assembly according to any preceding embodiment, wherein the first terminal includes: a base; a first wing extending from the base; a second wing spaced apart from the first wing; a planar portion connected to the base; and a tab extending perpendicularly from an end of the planar portion.
13. The assembly according to any preceding embodiment, wherein the planar portion is welded to the first exposed conductor portion of the flat cable and the tab is disposed in a recess of a first cover of the housing.
14. The assembly according to any preceding embodiment, including: a third wire disposed partially in the housing; a third terminal disposed in the housing, the third terminal connected to a third exposed conductor portion of the flat cable and the third wire such that the third exposed conductor portion is electrically connected to the third wire; and a second divider disposed between the second terminal and the third terminal, the second divider formed separately from the housing and the divider; wherein the housing includes a first cover and a second cover; the divider and the second divider are partially disposed in and engaged with an inner channel of the second cover; tabs of the first terminal, the second terminal, and the third terminal are disposed at least partially in a recess of the first cover; and a first distance between the first terminal and the second terminal is different than a second distance between the second terminal and the third terminal.
15. The assembly according to any preceding embodiment, including a fastener and a fastener bracket; wherein: the fastener bracket is detachably connected with the housing; the fastener is detachably connected with the fastener bracket; and the fastener is configured for connection with an external object.
16. The assembly of according to any preceding embodiment, including: a second housing including an identical configuration as the housing; and a second flat cable disposed at least partially in the second housing; wherein the housing includes a first cover and a second cover; the second housing includes a second housing first cover and a second housing second cover; and the second housing second cover is stacked on and engaged with the first cover of the housing.
17. The assembly of according to any preceding embodiment, wherein the second housing is connected with the housing such that a first attachment feature and a second attachment feature of the first cover of the housing are in contact with a first attachment structure and a second attachment structure of the second housing second cover.

18. A method of assembling the assembly according to any preceding embodiment, comprising: disposing the divider at least partially in an inner channel of the second cover; fixing a planar portion of the first terminal to the first exposed conductor portion of the flat cable; fixing a planar portion of the second terminal to the second exposed conductor portion of the flat cable; disposing the flat cable in contact with the second cover such that the divider is disposed between the first terminal and the second terminal; and connecting the first cover with the second cover.

19. The method according to embodiment 18, including: disposing at least a portion of a second flat cable in a second housing; and stacking the second housing on the housing such that the second housing is engaged with the housing.

20. The method according to embodiment 18 or 19, including: connecting a fastener bracket to the housing; connecting a fastener to the fastener bracket; and connecting the assembly with an external object.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both element, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. An assembly, comprising:
   a housing;
   a flat cable disposed at least partially in the housing and including a first exposed conductor portion and a second exposed conductor portion;
   a first wire disposed partially in the housing;
   a second wire disposed partially in the housing;
   a first terminal disposed in the housing, the first terminal connected to the first exposed conductor portion and the first wire such that the first exposed conductor portion is electrically connected to the first wire;
   a second terminal disposed in the housing, the second terminal connected to the second exposed conductor portion and the second wire such that the second exposed conductor portion is electrically connected to the second wire; and
   a divider disposed between the first terminal and the second terminal, the divider formed separately from the housing.

2. The assembly of claim 1, wherein the housing includes a first cover and a second cover.

3. The assembly of claim 2, wherein the first cover includes:
   a planar base;
   a first attachment feature extending from a first side of the base;
   a second attachment feature extending from the first side of the base;
   a wall extending from a second side of the base; and
   a projection extending from the second side of the base and spaced apart from the wall.

4. The assembly of claim 3, wherein the projection includes a first part extending from the base and a second part extending parallel to and spaced apart from the base; and
   in an assembled configuration, portions of the first terminal and the second terminal are disposed in a recess disposed between the wall and the first part of the projection.

5. The assembly of claim 2, wherein:
   the second cover includes an inner channel; and
   the divider is partially disposed in the inner channel.

6. The assembly of claim 5, wherein:
   the second cover includes a first outer channel and a second outer channel;
   the inner channel is disposed between the first outer channel and the second outer channel; and
   the second cover includes a first attachment structure disposed in the first outer channel and a second attachment structure disposed in the second outer channel.

7. The assembly of claim 5, wherein the divider includes an elongated first portion and a second portion extending from the first portion;
   the first portion includes a length greater than a length of the second portion; and
   in an assembled configuration, the second portion is disposed in the inner channel of the second cover.

8. The assembly of claim 7, wherein in the assembled configuration, the divider is positively engaged with the inner channel of the second cover such that removal of the divider from the second cover is restricted.

9. The assembly of claim 1, including a clip;
   wherein the housing includes a first cover and a second cover; and
   the clip secures the first cover with the second cover.

10. The assembly of claim 9, wherein:
    the clip includes a first leg, a second leg, a third leg, and a fourth leg;
    in an assembled configuration, the first leg and the second leg are in contact with an outer side of the first cover;
    the third leg is disposed in a first outer channel of the second cover; and
    the fourth leg is disposed in a second outer channel of the second cover.

11. The assembly of claim 9, including a second clip arranged opposite the clip.

12. The assembly of claim 1, wherein the first terminal includes:
    a base;
    a first wing extending from the base;
    a second wing spaced apart from the first wing;
    a planar portion connected to the base; and
    a tab extending perpendicularly from an end of the planar portion.

13. The assembly of claim 12, wherein the planar portion is welded to the first exposed conductor portion of the flat cable and the tab is disposed in a recess of a first cover of the housing.

14. The assembly of claim 1, including:
    a third wire disposed partially in the housing;
    a third terminal disposed in the housing, the third terminal connected to a third exposed conductor portion of the flat cable and the third wire such that the third exposed conductor portion is electrically connected to the third wire; and
    a second divider disposed between the second terminal and the third terminal, the second divider formed separately from the housing and the divider;
    wherein the housing includes a first cover and a second cover;
    the divider and the second divider are partially disposed in and engaged with an inner channel of the second cover;
    tabs of the first terminal, the second terminal, and the third terminal are disposed at least partially in a recess of the first cover; and
    a first distance between the first terminal and the second terminal is different than a second distance between the second terminal and the third terminal.

15. The assembly of claim 1, including a fastener and a fastener bracket; wherein:
    the fastener bracket is detachably connected with the housing;
    the fastener is detachably connected with the fastener bracket; and
    the fastener is configured for connection with an external object.

16. The assembly of claim 1, including:
    a second housing including an identical configuration as the housing; and
    a second flat cable disposed at least partially in the second housing;
    wherein the housing includes a first cover and a second cover;
    the second housing includes a second housing first cover and a second housing second cover; and the second housing second cover is stacked on and engaged with the first cover of the housing.

17. The assembly of claim 16, wherein the second housing is connected with the housing such that a first attachment feature and a second attachment feature of the first cover of the housing are in contact with a first attachment structure and a second attachment structure of the second housing second cover.

18. A method of assembling the assembly of claim 2, comprising:
- disposing the divider at least partially in an inner channel of the second cover;
- fixing a planar portion of the first terminal to the first exposed conductor portion of the flat cable;
- fixing a planar portion of the second terminal to the second exposed conductor portion of the flat cable;
- disposing the flat cable in contact with the second cover such that the divider is disposed between the first terminal and the second terminal; and
- connecting the first cover with the second cover.

19. The method of claim 18, including:
- disposing at least a portion of a second flat cable in a second housing; and
- stacking a second housing on the housing such that the second housing is engaged with the housing.

20. The method of claim 18, including:
- connecting a fastener bracket to the housing;
- connecting a fastener to the fastener bracket; and
- connecting the assembly with an external object.

\* \* \* \* \*